US009596586B2

(12) United States Patent
Zander

(10) Patent No.: US 9,596,586 B2
(45) Date of Patent: Mar. 14, 2017

(54) SYSTEM, METHOD, AND COMPUTER PROGRAM PRODUCT FOR SCANNING FREQUENCY BANDS

(71) Applicant: Sony Corporation, Tokyo (JP)

(72) Inventor: Olof Zander, Södra Sandby (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 2 days.

(21) Appl. No.: 14/610,911

(22) Filed: Jan. 30, 2015

(65) Prior Publication Data
US 2016/0227393 A1    Aug. 4, 2016

(51) Int. Cl.
*H04W 4/00*     (2009.01)
*H04W 8/00*     (2009.01)
*H04W 48/18*    (2009.01)
*H04W 8/18*     (2009.01)

(52) U.S. Cl.
CPC ........... *H04W 8/005* (2013.01); *H04W 8/183* (2013.01); *H04W 48/18* (2013.01)

(58) Field of Classification Search
CPC ..... H04W 8/005; H04W 8/183; H04W 48/18; H04W 4/003; H04W 60/005; H04W 88/06
USPC .............................. 455/434, 436, 444, 552.1
See application file for complete search history.

(56) References Cited

U.S. PATENT DOCUMENTS

| 8,433,318 | B2 * | 4/2013 | Krishnamoorthy ... | H04W 48/16 455/434 |
| 8,725,201 | B2 * | 5/2014 | Wu ...................... | H04B 1/0053 455/314 |
| 9,037,190 | B2 * | 5/2015 | Desclos ................ | H04B 7/15 455/550.1 |
| 9,204,459 | B2 * | 12/2015 | Mueck .................. | H04L 5/00 |
| 2006/0178122 | A1 * | 8/2006 | Srinivasan ............. | H04B 1/006 455/168.1 |

(Continued)

OTHER PUBLICATIONS

QUALCOMM Incorporated, "Considerations for single-chip implementations of carrier aggregation", 3GPP Draft,; R4-131235, 3rd Generation Partnership Project (3GPP), Mobile Competence Centre; 650, Route Des Lucioles; F-06921 Sophia-Antipolis Cedex; France, vol. RAN WG4, no. Chicago; 20130415-20130419, Apr. 9, 2013, XP050701942, Retrieved from the Internet: UTL:http://www.3gpp.org/ftp/tsg_ran/WG4_Radio/TSGR4_66bis/Docs/ [retrieved on Apr. 9, 2013].
International Search Report and Written Opinion; Oct. 19, 2015; issued in International Patent Application No. PCT/EP2015/067493.

*Primary Examiner* — Mong-Thuy Tran
(74) *Attorney, Agent, or Firm* — James C. Edwards; Moore & Van Allen PLLC

(57) ABSTRACT

The invention is directed to systems, methods and computer program products for scanning frequency bands at a device in order to find a network. An exemplary method comprises substantially simultaneously scanning a first frequency band using a first receive chain in the device and a second frequency band using a second receive chain in the device; determining, based on priority information accessed by the device, whether a first network found on the first frequency band has priority over a second network found on the second frequency band; and determining whether to connect the device to the first network or the second network based on determining whether the first network has priority over the second network.

15 Claims, 2 Drawing Sheets

(56) References Cited

U.S. PATENT DOCUMENTS

| | | | |
|---|---|---|---|
| 2007/0004405 A1* | 1/2007 | Buckley | H04W 48/18 455/434 |
| 2009/0156257 A1* | 6/2009 | Shi | H04W 48/12 455/558 |
| 2011/0014913 A1* | 1/2011 | Yoon | H04W 48/20 455/435.3 |
| 2012/0264425 A1 | 10/2012 | Krishnamoorthy et al. | |
| 2013/0072256 A1* | 3/2013 | Su | H04W 52/0274 455/558 |
| 2013/0136211 A1 | 5/2013 | Jussila et al. | |
| 2014/0128070 A1* | 5/2014 | Ni | H04W 48/16 455/435.2 |
| 2014/0141776 A1 | 5/2014 | Ko | |
| 2014/0364118 A1* | 12/2014 | Belghoul | H04W 4/003 455/435.1 |
| 2015/0289221 A1* | 10/2015 | Nayak | H04W 60/005 455/435.1 |
| 2015/0296364 A1* | 10/2015 | Peruru | H04W 8/005 455/434 |
| 2015/0296520 A1* | 10/2015 | Batchu | H04W 72/0493 455/434 |
| 2016/0021660 A1* | 1/2016 | Krishnamurthy | H04W 72/0453 455/452.1 |
| 2016/0066253 A1* | 3/2016 | Kollu | H04M 11/066 370/328 |
| 2016/0095156 A1* | 3/2016 | Mitra | H04W 76/028 370/329 |

* cited by examiner

SYSTEM, METHOD, AND COMPUTER PROGRAM PRODUCT FOR SCANNING FREQUENCY BANDS

BACKGROUND

User equipment (UEs) such as mobile phones can scan ten or more frequency bands. The scanning process can take a long time—up to several minutes. The scanning process takes especially longer when booting a UE for the first time. The long waiting process results in a negative user experience. The present invention is directed to resolving this negative user experience.

BRIEF SUMMARY

Embodiments of the invention are directed to systems, methods and computer program products for scanning networks at a device. An exemplary method comprises substantially simultaneously scanning a first frequency band using a first receive chain in the device and a second frequency band using a second receive chain in the device; determining, based on priority information accessed by the device, whether a first network found on the first frequency band has priority over a second network found on the second frequency band; and determining whether to connect the device to the first network or the second network based on determining whether the first network has priority over the second network.

In some embodiments, the first network or the second network is associated with a standardization specified by the $3^{rd}$ Generation Partnership Project (3GPP).

In some embodiments, the priority information is comprised in a Subscriber Identity Module (SIM) inserted into the device.

In some embodiments, the first receive chain or the second receive chain comprises at least one frequency synthesizer, at least one filter, at least one low noise amplifier, or at least one analog to digital converter.

In some embodiments, the first network or the second network comprises at least one local area network (LAN) or cellular network.

In some embodiments, the first receive chain is independent from the second receive chain.

In some embodiments, a first frequency band associated with the first network and a second frequency band associated with the second network are received by a single radio frequency (RF) receive chain.

In some embodiments, a signal received by the single receive chain is split into at least two channels in baseband circuitry of the device.

In some embodiments, the device comprises at least one of a mobile computing device, a non-mobile computing device, a mobile phone, a television, a watch, or a tablet computing device.

In some embodiments, a device is provided for scanning frequency bands at a device in order to find a network. The device comprises: a memory; a processor; a first receive chain for scanning a first frequency band; a second receive chain for scanning a second frequency band simultaneously when the first frequency band is scanned by the first receive chain; and a module, stored in memory, executable by the processor, and configured to: determine, based on priority information accessed by the device, whether the first network found on the first frequency band has priority over the second network found on the second frequency band; and determine whether to connect the device to the first network or the second network based on determining whether the first network has priority over the second network.

In some embodiments, a computer program product is provided for scanning frequency bands at a device in order to find a network. The computer program product comprises a non-transitory computer-readable medium comprising a set of codes for causing a computer to: substantially simultaneously scan a first frequency band using a first receive chain in the device and a second frequency band using a second receive chain in the device; determine, based on priority information accessed by the device, whether the first network found on the first frequency band has priority over the second network found on the second frequency band; and determine whether to connect the device to the first network or the second network based on determining whether the first network has priority over the second network.

BRIEF DESCRIPTION OF THE DRAWINGS

Figure 1:
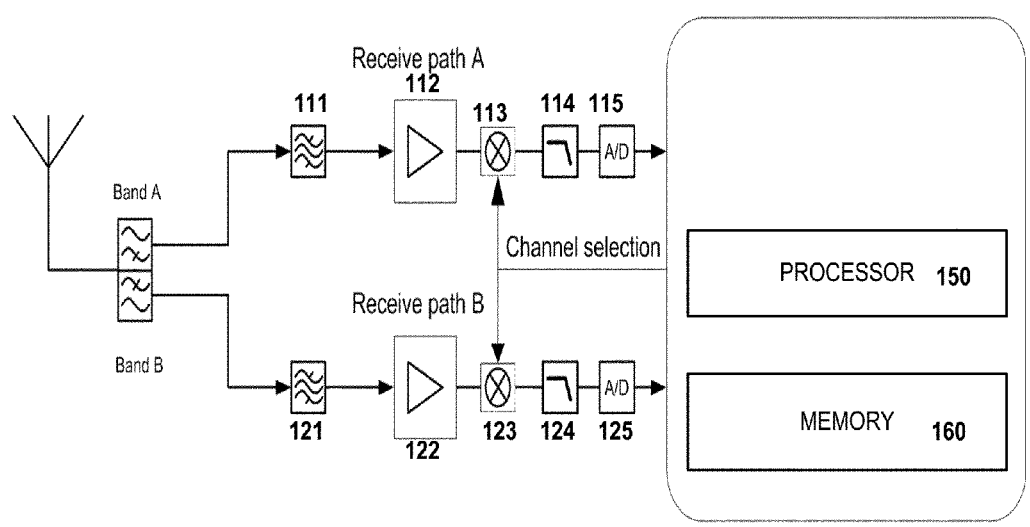
Figure 2:
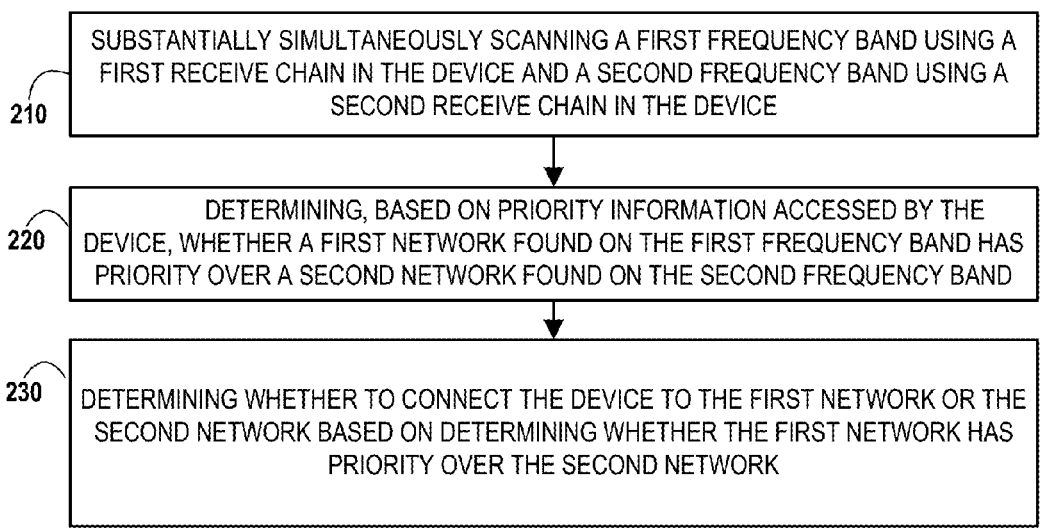

Having thus described embodiments of the invention in general terms, reference will now be made to the accompanying drawings, where:

FIG. 1 is an exemplary block diagram of a receiver path for carrier aggregation (CA), in accordance with embodiments of the present invention;

FIG. 2 is an exemplary method, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

A device may be referred to as a node or user equipment (UE). For the purpose of sending or receiving data, the device may connect to a wireless local area network (WLAN) or a cellular network (including evolution of $3^{rd}$ Generation Partnership Project (3GPP) releases and $5^{th}$ Generation (5G) releases). The WLAN comprises at least one access point (AP). The cellular network comprises at least one base station (BS).

When a UE is turned on, the UE searches for an appropriate network to camp on for the purpose of transmitting and/or receiving data. For Long Term Evolution (LTE) enabled UEs the default network to camp on is an LTE network. In order to find a network, the default scanning process as executed by the UE is to scan all channels in all frequency bands implemented in the UE until an allowed network is found. The order the bands that are scanned is usually the 3GPP band number from low to high. UEs such as mobile phones can have ten or more LTE bands implemented and the scanning process can take a long time—up to several minutes. The scanning process takes especially longer when booting a UE for the first time. The long waiting process results in a negative user experience. In some cases, a function for prioritizing bands most likely to have service for the UE (i.e., the UE is likely to camp on those bands) is implemented in the UE. This prioritization may be based on information stored on the Subscriber Identity Module (SIM) that is inserted into the UE.

The present invention is directed to speeding up the scanning process. In modern UEs, a function called carrier aggregation (CA) is implemented in a UE. This function implies the UE can use two or more frequency bands simultaneously in order to increase the data throughput (i.e., the amount of data transmitted and/or received by the UE in unit time). CA implies there are two or more receive chains including channel selection functionality (often referred to as frequency synthesizers) implemented in the UE. The present invention accomplishes higher speeds by using multiple receive chains, intended for CA, to scan for networks in parallel. While the UE's hardware is configured for carrier aggregation, the goal of the present invention is to use the hardware for other purposes during the network selection process. Referring now to FIG. 1, FIG. 1 presents a receiver configured for CA. Although not shown in FIG. 1, a second receiver (e.g., a diversity receiver or a multiple input multiple output (MIMO) receiver) can also be used in the UE and will have the same structure as the receiver presented in FIG. 1. The present invention uses two (or more) receive chains independently in parallel for the frequency band scanning process (or the network scanning process). By doing so, the scanning time can be halved (or more for higher order CA such as 3CA with three receive chains or 4CA with four receive chains). Other functions such as band order selection can be used in parallel with the frequency band scanning process described herein. FIG. 1 presents receive path A and receive path B. Receive path A is associated with Band A. Signals for band A is filtered in an band selection filter 111 and then arrive at low noise amplifier 112, then is down converted in mixer 113, then pass through a filter 114, then pass through an analog to digital converter 115, and then reach a processor 150. Signals for band B is filtered in an band selection filter 121 and then arrive at low noise amplifier 122, then is down converted in mixer 123, then pass through a filter 124, then pass through an analog to digital converter 125, and then reach the processor 150. The processor 150 can scan both bands A and B substantially simultaneously and is connected to and controls the channel selection of the down conversion mixers 123 and 113. The processor 150 interacts with at least one of the memory 160 and/or the module stored in the memory 160. The memory 160 stores instructions and/or data. The module is stored in the memory 160, executable by the processor 150, and enables the device to perform the various functions described herein. The processor 150 scans both bands A and B and selects at least one of band A or B. As used herein, the terms network and "frequency band" may be used interchangeably in some embodiments.

One embodiment of CA is contiguous intraband CA where two or more adjacent channels in the same frequency band are aggregated. One way of implementing this embodiment is to use a single common high frequency (e.g., equal to or greater than a threshold frequency) receive chain and split an incoming signal into two channels in the baseband circuitry of the UE to be further processed by the UE as two (or more) independent data streams. Even in this embodiment of CA, the present invention makes it possible to speed up the scanning process where the frequency (or channel or network) scanning steps are two (or more if higher order CA is used) since two (or more) channels are decoded. The present invention enables simultaneous parallel scanning of these frequencies (or channels or networks).

Referring now to FIG. 2, FIG. 2 presents an exemplary method for scanning frequency bands at a device in order to find a network. At step 210, the method comprises substantially simultaneously scanning a first frequency band using a first receive chain in the device and a second frequency band using a second receive chain in the device. At step 220, the method comprises determining, based on priority information accessed by the device, whether the first network found on the first frequency band has priority over the second network found on the second frequency band. At step 230, the method comprises determining whether to connect the device to the first network or the second network based on determining whether the first network has priority over the second network. The present invention is not limited to scanning two frequency bands. The present invention is capable of being extended to devices that scan two or more (e.g., three) frequency bands.

As described herein, the device scans at least one frequency band to find a network. For example, in some cases, the device may need to scan five or more frequency bands before finding a network that permits the device to camp on the network. While scanning frequency bands, the device may find at least one frequency band that is empty or not being used by devices to camp on. Other frequency bands may have forbidden networks (e.g., forbidden for all devices, or forbidden for a device that does not meet the network's requirements). Therefore, in some embodiments, the method comprises the steps of determining whether a network is found on a frequency band, and whether the network permits the device to camp on the network (e.g., based on the device's authentication credentials, device specifications, etc.).

In some embodiments, the first network or the second network is associated with a standardization specified by the 3GPP. In some embodiments, the priority information is comprised in a SIM inserted into the device.

In some embodiments, the first receive chain or the second receive chain comprises at least one frequency synthesizer, at least one filter, at least one low noise amplifier, or at least one analog to digital converter. In some embodiments, the first network or the second network comprises at least one local area network (LAN) or cellular network. In some embodiments, the first receive chain is independent from the second receive chain.

In some embodiments, a first frequency band associated with the first network and a second frequency band associated with the second network are received by a single radio frequency (RF) receive chain. In some embodiments, a signal received by the single receive chain is split into at least two channels in baseband circuitry of the device.

Each UE or device described herein includes a processor, a memory, and a module stored in the memory, executable by the processor, and configured to perform the various processes described herein, including the capability to communicate with other devices on any network.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

The invention is not limited to any particular types of UEs. As used herein, a UE may also be referred to as a device, a system, or apparatus. Examples of UEs include mobile phones or other mobile computing devices, mobile televisions, laptop computers, smart screens, tablet computers or tablets, portable desktop computers, e-readers, scanners, portable media devices, gaming devices, cameras or other image-capturing devices, headgear, eyewear, watches, bands (e.g., wristbands) or other wearable devices, or other portable computing or non-computing devices.

The various features described with respect to any embodiments described herein are applicable to any of the other embodiments described herein. As used herein, the terms data and information may be used interchangeably. Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable information processing apparatus in order to produce a particular machine, such that the one or more computer-executable program code portions, which execute via the processor of the computer and/or other programmable information processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable information processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable information processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for scanning frequency bands at a device in order to find a network, the method comprising:
   receiving, at a single radio frequency (RF) receive chain, a signal;
   splitting the signal into first and second channels, wherein the first channel comprises a first frequency band and the second channel comprises a second frequency band that is different from the first frequency band;
   in response to splitting the signal, substantially simultaneously scanning the first frequency band and the second frequency band;
   determining, based on priority information accessed by the device, whether a first network found on the first frequency band has priority over a second network found on the second frequency band; and
   determining whether to connect the device to the first network or the second network based on determining whether the first network has priority over the second network.

2. The method of claim 1, wherein the first network and the first frequency band or the second network and the second frequency band are associated with a standardization specified by the $3^{rd}$ Generation Partnership Project (3GPP).

3. The method of claim 1, wherein the priority information is comprised in a Subscriber Identity Module (SIM) inserted into the device.

4. The method of claim 1, wherein substantially simultaneously scanning further comprises scanning the first frequency using a first frequency synthesizer, a first filter, a first low noise amplifier and a first analog to digital converter and scanning the second frequency using second frequency synthesizer, a second filter, a second low noise amplifier, and a second analog to digital converter.

5. The method of claim 1, wherein the first network or the second network comprises at least one local area network (LAN) or cellular network.

6. The method of claim 1, wherein the device comprises at least one of a mobile computing device, a non-mobile computing device, a mobile phone, a television, a watch, or a tablet computing device.

7. A device for scanning frequency bands in order to find a network, the device comprising:
   a memory;
   a processor;
   a single radio frequency (RF) receive chain for receiving a signal;
   a splitter for splitting the signal into first and second channels, wherein the first channel comprises a first frequency band and the second channel comprises a second frequency band that is different from the first frequency band;
   a first scanning path for scanning the first frequency band;
   a second scanning path for scanning the second frequency band simultaneously when the first frequency band is scanned by the first scanning path; and
   a module, stored in memory, executable by the processor, and configured to:
      determine, based on priority information accessed by the device, whether a first network found on the first frequency band has priority over a second network found on the second frequency band; and
      determine whether to connect the device to the first network or the second network based on determining whether the first network has priority over the second network.

8. The device of claim 7, wherein the first network or the second network is associated with a standardization specified by the $3^{rd}$ Generation Partnership Project (3 GPP).

9. The device of claim 7, wherein the priority information is comprised in a Subscriber Identity Module (SIM) inserted into the device.

10. The device of claim 7, wherein the first scanning path or the second scanning path comprises at least one frequency synthesizer, at least one filter, at least one operational amplifier, or at least one analog to digital converter.

11. The device of claim 7, wherein the first network or the second network comprises at least one local area network (LAN) or cellular network.

12. The device of claim 7, wherein the first scanning path is independent from the second scanning path.

13. A computer program product for scanning frequency bands at a device in order to find a network, the computer program product comprising:
   a non-transitory computer-readable medium comprising a set of codes for causing a computer to:
      receive, at a single radio frequency (RF) receive chain, a signal;
      split the signal into first and second channels, wherein the first channel comprises a first frequency band and the second channel comprises a second frequency band that is different from the first frequency band;
      in response to splitting the signal, substantially simultaneously scan the first frequency band and the second frequency band;
      determine, based on priority information accessed by the device, whether a first network found on the first frequency band has priority over a second network found on the second frequency band; and
      determine whether to connect the device to the first network or the second network based on determining whether the first network has priority over the second network.

14. The computer program product of claim 13, wherein substantially simultaneously scan further comprises scan the first frequency using a first frequency synthesizer, a first filter, a first low noise amplifier and a first analog to digital converter and scan the second frequency using second frequency synthesizer, a second filter, a second low noise amplifier, and a second analog to digital converter.

15. The computer program product of claim 13, wherein the first network or the second network comprises at least one local area network (LAN) or cellular network.

* * * * *